United States Patent
Kimura

(10) Patent No.: US 7,317,379 B2
(45) Date of Patent: Jan. 8, 2008

(54) ANTENNA SWITCHING EQUIPMENT

(75) Inventor: Shigekazu Kimura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 183 days.

(21) Appl. No.: 11/169,693

(22) Filed: Jun. 30, 2005

(65) Prior Publication Data
US 2006/0220870 A1    Oct. 5, 2006

(30) Foreign Application Priority Data
Mar. 18, 2005  (JP)  ............... 2005-079633

(51) Int. Cl.
*H04Q 5/22* (2006.01)
(52) U.S. Cl. .................... 340/10.51; 343/906
(58) Field of Classification Search ............ 340/10.51, 340/572.7; 343/904, 906; 307/112
See application file for complete search history.

(56) References Cited

U.S. PATENT DOCUMENTS

| 6,069,564 A * | 5/2000 | Hatano et al. ........... 340/572.7 |
| 6,595,418 B1 * | 7/2003 | Igarashi et al. ............ 235/385 |
| 2002/0175805 A9 * | 11/2002 | Armstrong et al. ...... 340/10.31 |
| 2004/0201539 A1 * | 10/2004 | Yewen .................... 343/867 |
| 2005/0054293 A1 * | 3/2005 | Bann ....................... 455/41.3 |

FOREIGN PATENT DOCUMENTS

| JP | 08-321785 | 12/1996 |
| JP | 2004-227315 | 8/2004 |
| JP | 2004-303175 | 10/2004 |
| JP | 2004-328605 | 11/2004 |

OTHER PUBLICATIONS

Korean Office Action; Korean Published Patent No. 1996-0043593; Dec. 23, 1996; 4 pages.

* cited by examiner

*Primary Examiner*—Thomas Mullen
(74) *Attorney, Agent, or Firm*—Bingham McCutchen LLP

(57) ABSTRACT

Antenna switching equipment switches antennas for a reader/writer. A power generation unit generates electric power from an RF signal outputted from the reader/writer. A switching signal generation unit, operating on electric power generated by the power generation unit, generates a switching signal for specifying an antenna port to be used from among a plurality of antenna ports. A high frequency switch unit, operating on electric power generated by the power generation unit, switches a connection between the reader/writer and one of a plurality of antenna ports based on a switching signal generated by the switching signal generation unit.

7 Claims, 10 Drawing Sheets

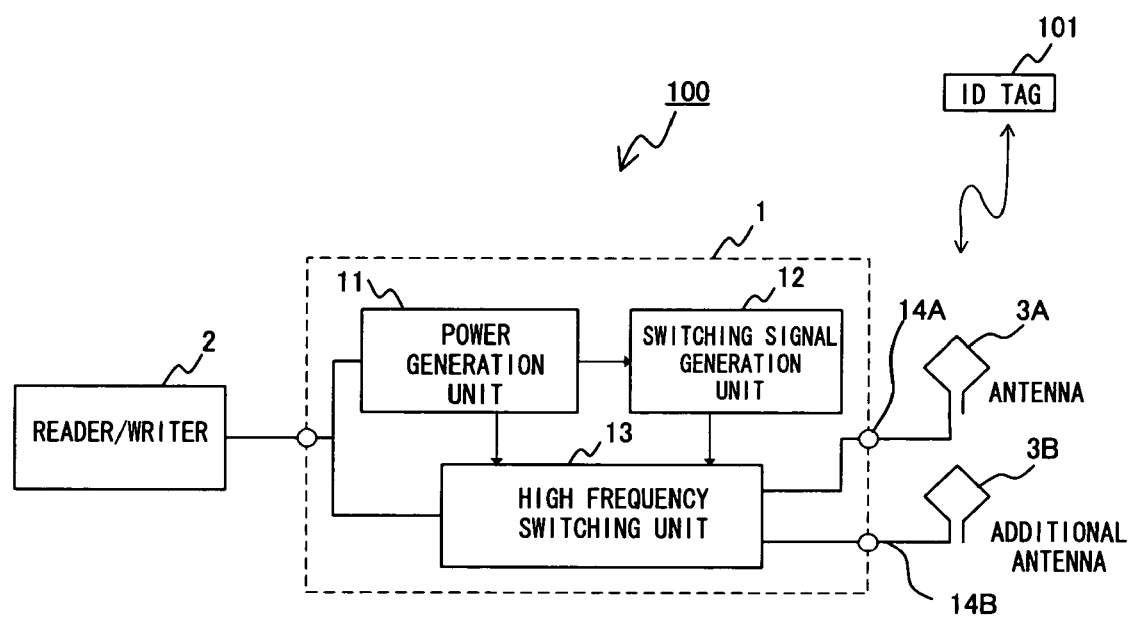
F I G. 1

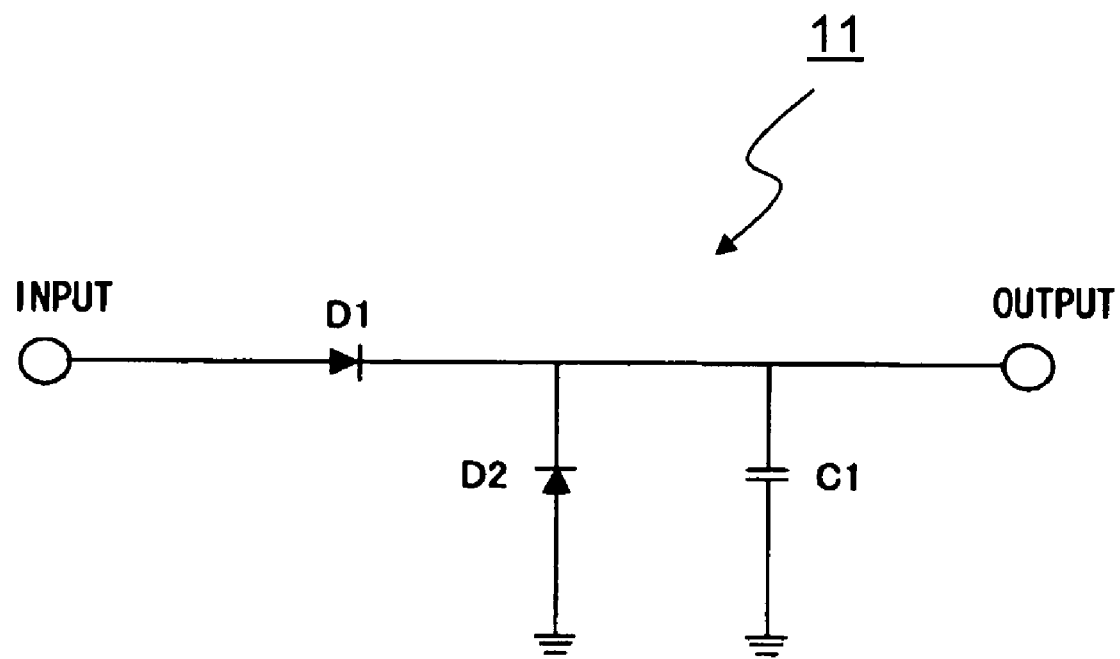
F I G. 3

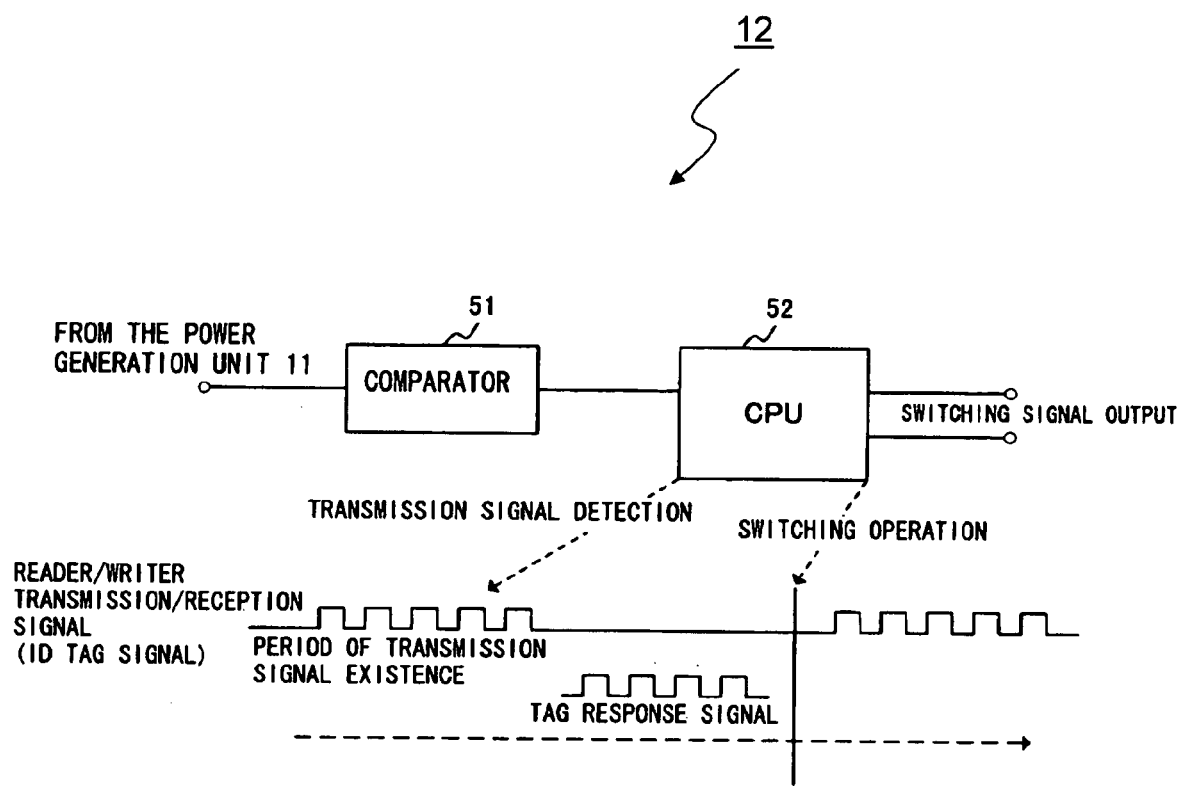
F I G. 5

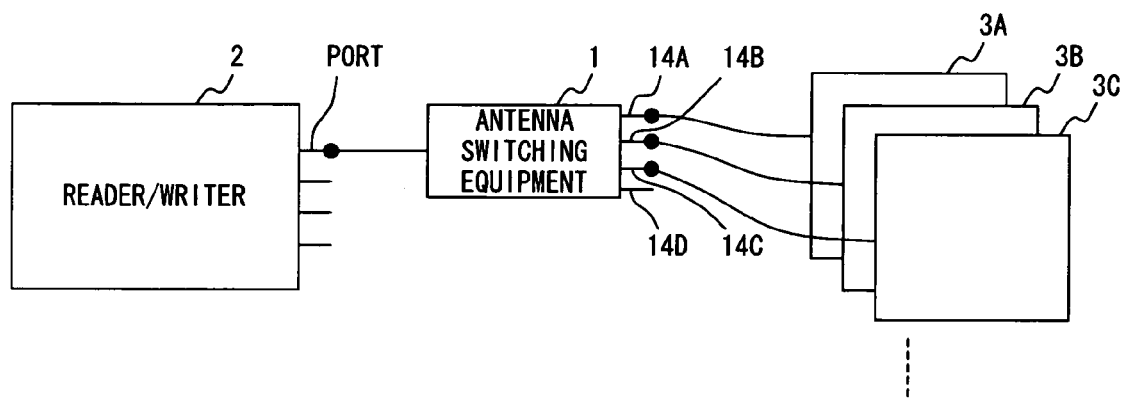
F I G. 8 A

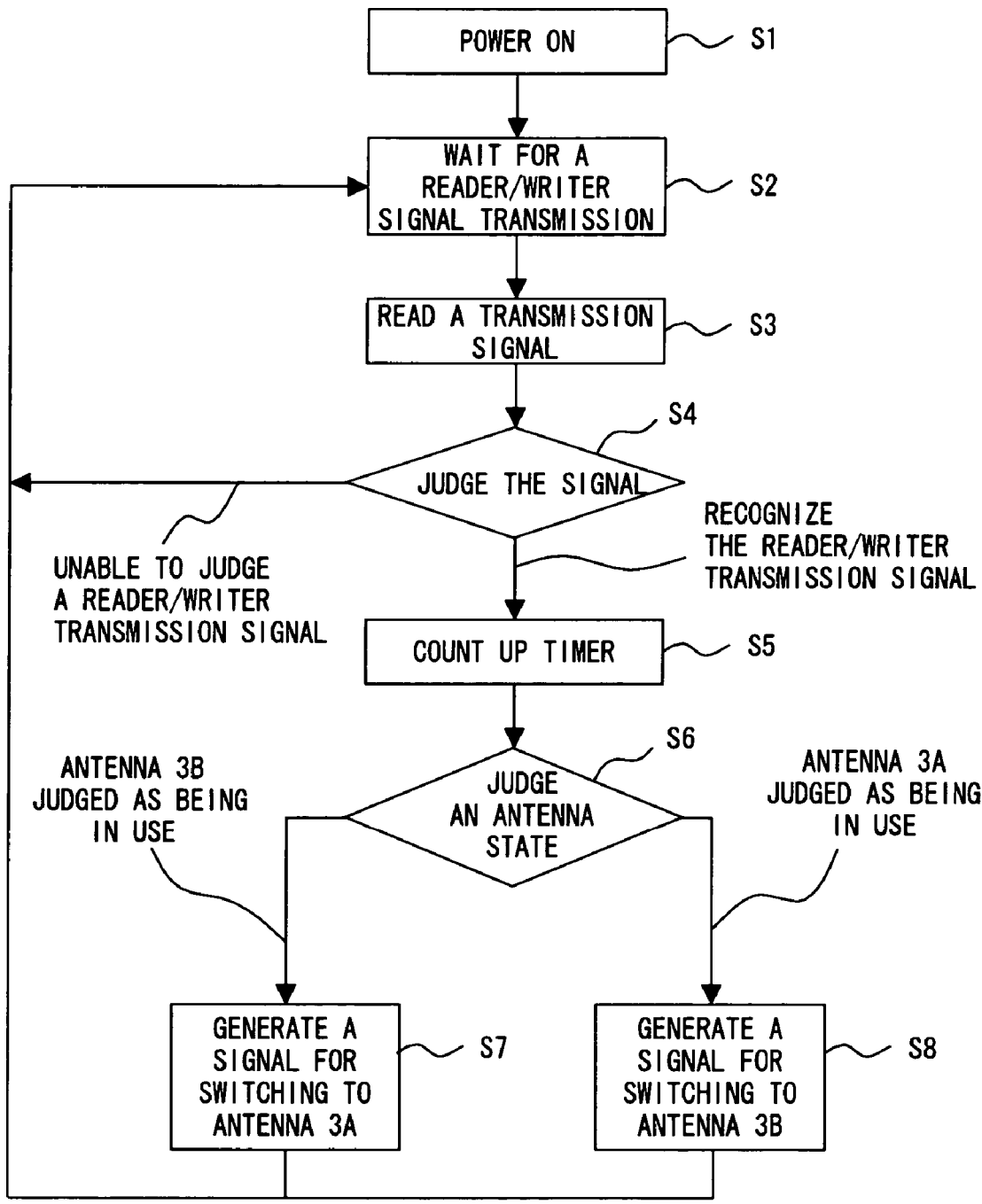
F I G. 9

ANTENNA SWITCHING EQUIPMENT

BACKGROUND OF THE INVENTION

1. Field of the Invention

The present invention relates to a technique for switching between antennas for a reader/writer in an RFID (radio frequency identification) system.

2. Description of the Related Art

An ID tag used for a noncontact tag in an RFID system comprises internally a transmission/reception element. The ID tag transmits and receives radio waves or electromagnetic waves to and from a reader/writer by using the transmission/reception element to exchange a series of information stored by the ID tag. As for a power supply circuit, there is a known technique comprising an antenna coil which resonates with a received radio frequency of a reader/writer when coming into proximity thereto to extract power by rectifying and smoothing the output from the antenna coil (e.g., patent document 1).

A reader/writer comprises an antenna for transmitting and receiving radio waves or electromagnetic waves to and from an ID tag. Here, the intensity of radio wave which the ID tag received from the reader writer varies with position and/or direction of the ID tag relative to the reader/writer. Accordingly there is a practical reader/writer which comprises a plurality of antennas in an attempt to improve reception sensitivity for an ID tag regardless of positional relationship between the reader/writer and the ID tag (e.g., refer to patent documents 2 and 3). Such a reader/writer is capable of positioning antennas in respectively different directions, such as two or four directions. Such a configuration enables the ID tag to exchange data with a reader/writer by way of any one of the antennas, thereby improving the quality of communication between the ID tag and reader/writer as compared to the case of only-using one antenna.

[Patent document 1] Japanese laid-open patent application publication No. 2004-303175 (Abstract, FIG. 1 and paragraph 0006)

[Patent document 2] Japanese laid-open patent application publication No. 2004-227315 (Abstract, FIG. 1 and paragraph 0008)

[Patent document 3] Japanese laid-open patent application publication No. 2004-328605 (Abstract, FIG. 1 and paragraph 0008)

Incidentally, if a plurality of antennas is equipped for diversity as described above, there is a possibility of radio wave interference occurring in a specific direction. Communication between the ID tag and reader/writer could possibly be disrupted at a point where the interference occurs even though it is within the range of radio communication in terms of distance. In this case, the problem will be solved if an additional antenna can be installed for covering the direction of interference occurrence. An additional antenna cannot be installed, however, if the reader/writer does not have a plurality of antenna ports or connecting leads, or all the equipped antenna ports or connecting leads are already in use. Besides, if the reader/writer per se is to be changed to increase the number of antenna ports, further work and capital investment will be required.

SUMMARY OF THE INVENTION

The purpose of the present invention is to provide antenna switching equipment enabling the simple addition of an antenna to a reader/writer and the use of the antenna without changing the reader/writer in a system for transmitting and receiving a radio frequency signal between the reader/writer and an ID tag.

In order to solve the above described problem, the present invention provides antenna switching equipment for switching antennas used for a reader/writer in an RFID system, comprising a plurality of antenna ports; a power supply unit for generating electric power from an RF signal outputted from the reader/writer; a switching signal generation unit, operating on electric power generated by the power supply unit, for generating a switching signal which specifies an antenna port to be used from among the plurality of antenna ports; and a switching unit, operating on electric power generated by the power supply unit, for switching a connection between the reader/writer and the plurality of antenna ports based on a switching signal generated by the switching signal generation unit.

In the above described antenna switching equipment, the electric power is generated from an RE signal supplied by the reader/writer. The switching signal generation unit and switching unit receive the electric power. The switching signal generation unit generates a switching signal for specifying an antenna port to be used for communicating with the ID tag from among a plurality thereof. The switching unit switches to the antenna port which is connected to the antenna for transmitting and receiving a signal based on the switching signal. An additional antenna can be connected to a spare antenna port among the plurality thereof.

The switching signal generation unit may be configured to generate a switching signal for specifying one of the plurality of antenna ports sequentially in a predetermined interval. Alternatively, the switching signal generation unit may be configured to include a self-running multi-vibrator circuit which repeats on and off states alternately in a predetermined interval. Or, by comprising a detection unit for detecting an ID tag signal superimposed with the RF signal, the switching signal generation unit may be configured to output the switching signal for switching to an antenna port to be used when a predetermined time is elapsed after the detection unit has detected the ID tag signal. Either of the above described switching signal generation units is capable of generating a switching signal for switching antenna ports one after another, thereby enabling transmission diversity and helping to improve the quality of communication.

The present invention is not limited to the above described antenna switching equipment. Rather, the present invention includes an antenna for an RFID reader/writer containing the above described antenna switching equipment for instance.

According to the present invention, the antenna switching equipment requires no external power supply since the electric power is generated by using the RF signal emitted from the reader/writer to the ID tag. Further, the antenna switching equipment according to the present invention generates a switching signal for switching antenna ports within the antenna switching equipment instead of receiving a switching signal from the reader/writer, and therefore, addition of an antenna is possible without changing the configuration of the reader/writer if a necessity for adding another antenna arises after equipping the reader/writer.

BRIEF DESCRIPTION OF THE DRAWINGS

FIG. 1 is a block diagram of the antenna switching equipment according to the present invention;

FIG. 3 shows an example of the power generation unit according to a preferred embodiment;

FIG. 5 shows an example of a switching signal generation unit according to another preferred embodiment;

FIG. 8A describes how antenna switching equipment is furnished (part 1);

FIG. 9 is a flow chart of antenna switching equipment operation according to a preferred embodiment.

DESCRIPTION OF THE PREFERRED EMBODIMENTS

Figure 2:
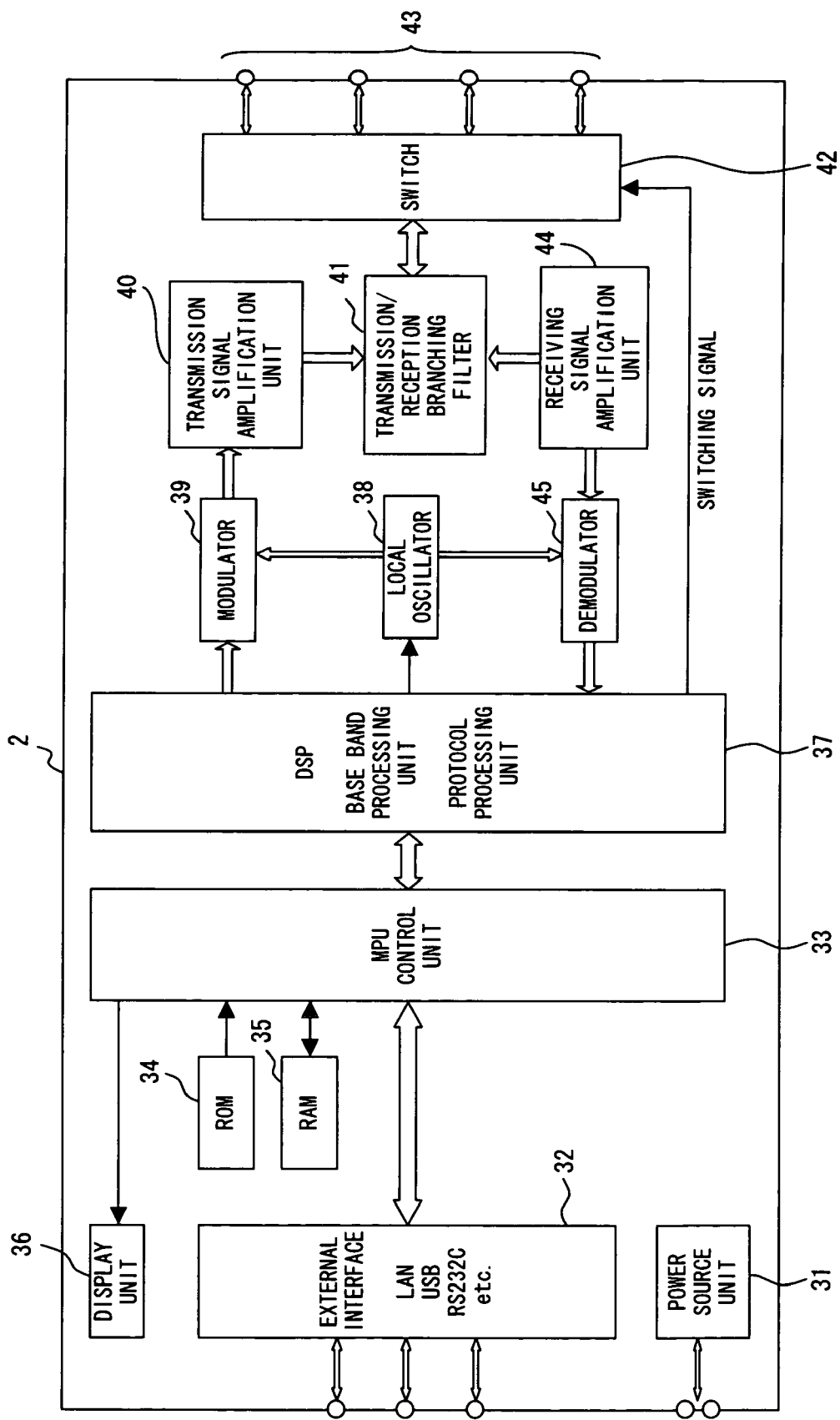
FIG. 2 is a block diagram of the reader/writer.

The following is a detailed description of the preferred embodiment of the present invention referring to the accompanying drawings.

FIG. 1 is a block diagram of antenna switching equipment according to the present invention. Here, a reader/writer 2 for equipping the antenna switching equipment 1 of the preferred embodiment, and an antenna 3 (i. e., 3A and 3B) used by the reader/writer 2, are depicted in the drawing.

The antenna switching equipment 1 comprises a power generation unit 11, a switching signal generation unit 12, a high frequency switch unit 13 and a plurality of antenna ports 14. The power generation unit 11 generates a DC (direct current) voltage for supplying the equipment itself by utilizing an RF signal outputted from the reader/writer 2 to the antenna switching equipment 1. The switching signal generation unit 12, operating on the electric power supplied by the power generation unit 11, generates a switching signal for specifying an antenna port 14A or 14B, as the one to be used, from among a plurality of antenna ports 14. The high frequency switch unit 13, operating on the electric power supplied by the power generation unit 11, switches the antenna ports 14 for use in communication based on the switching signal received from the switching signal generation unit 12. The antenna ports 14 are terminals equipped for connecting the antenna switching equipment 1 to the antenna 3.

The reader/writer 2 carries out communication with a noncontact tag, i.e., ID tag 101, to read data written therein, or writes data therein, in an RFID system 100. The antenna 3 is used for transmission and reception between the reader/writer 2 and the ID tag 101.

FIG. 2 is a block diagram of reader/writer 2. In FIG. 2, a power source unit 31 is connected to an external power source and generates electric power to be supplied to a series of circuits within the reader/writer 2. An external interface 32 exchanges data with an external apparatus (such as a server computer which manages the RFID system 100). In this case, an MPU control unit 33 processes a signal transmitted and received by way of the external interface 32 while using a ROM 34 and RAM 35. A display unit 36 displays necessary information in compliance with instruction from the MPU control unit 33.

A DSP 37 provides the functions of processing the base band signal and of protocol processing. A modulator 39 modulates data to be transmitted to the ID tag 101 by using a carrier signal generated by a local oscillator 38. Note that the carrier signal is an RF band signal. A transmission signal amplification unit 40 amplifies output from the modulator 39. And the amplified signal is conducted to a switch 42 by way of a transmission/reception branching filter 41. The switch 42 is connected by a plurality of I/O (input/output) ports 43. And the switch 42 connects between the transmission/reception branching filter 41 and the I/O port 43 discretionarily in accordance with a switching signal from the DSP 37.

Each I/O port 43 is connected by an antenna for exchanging a signal with the ID tag 101. In the example shown by FIG. 2, four antennas can be connected. And a signal addressed to the ID tag 101 is transmitted by way of an antenna selected by the switch 42. If there is a need for adding an antenna, the antenna switching equipment 1 shown by FIG. 1 is connected to a discretionary I/O port 43 and the necessary number of antennas will be connected thereto.

A signal from the ID tag 101 is led to a receiving signal amplification unit 44 by way of an antenna (not shown herein), switch 42 and transmission/reception branching filter 41. The received signal amplified by the receiving signal amplification unit 44 is demodulated by a demodulator 45 to be transmitted to the DSP 37.

In the antenna switching equipment 1 according to the present embodiment, the power generation unit 11 generates electric power to be supplied to a series of circuits within the equipment itself by using the RF signal transmitted from the reader/writer 2 to the ID tag 101. The electric power generated thereby is supplied to the switching signal generation unit 12 and high frequency switch unit 13. The switching signal generation unit 12 generates a switching signal for specifying an antenna port to be used from among a plurality of antenna ports 14. The high frequency switch unit 13 connects the applicable antenna port 14 with the reader/writer 2 by using the switching signal. The reader/writer 2 communicates with the ID tag 101 by using the connected antenna port 14 and an antenna 3 (i.e., 3A or 3B) connected thereto. The following description is of specific details of configurations of the power generation unit 11, switching signal generation unit 12 and high frequency switch unit 13 and is given while referring to FIGS. 3 through 7.

FIG. 3 shows an example of the power generation unit 11. The power generation unit 11 shown by FIG. 3, is generally for use as a smoothing circuit, and comprises diodes D1 and D2, and a smoothing capacitor C1. And, a DC voltage is generated by the diodes D1 and D2 rectifying an inputted RF signal and the capacitor C1 smoothing the rectified signal. The DC voltage is supplied to the switching signal generation unit 12 and the high frequency switch unit 13.

Incidentally, while in FIG. 3 a half-wave double rectifier circuit is shown, the present embodiment is not limited as such. It may, for example, be a full-wave rectifier or an n-times voltage circuit in accordance with the required voltage.

Figure 4:
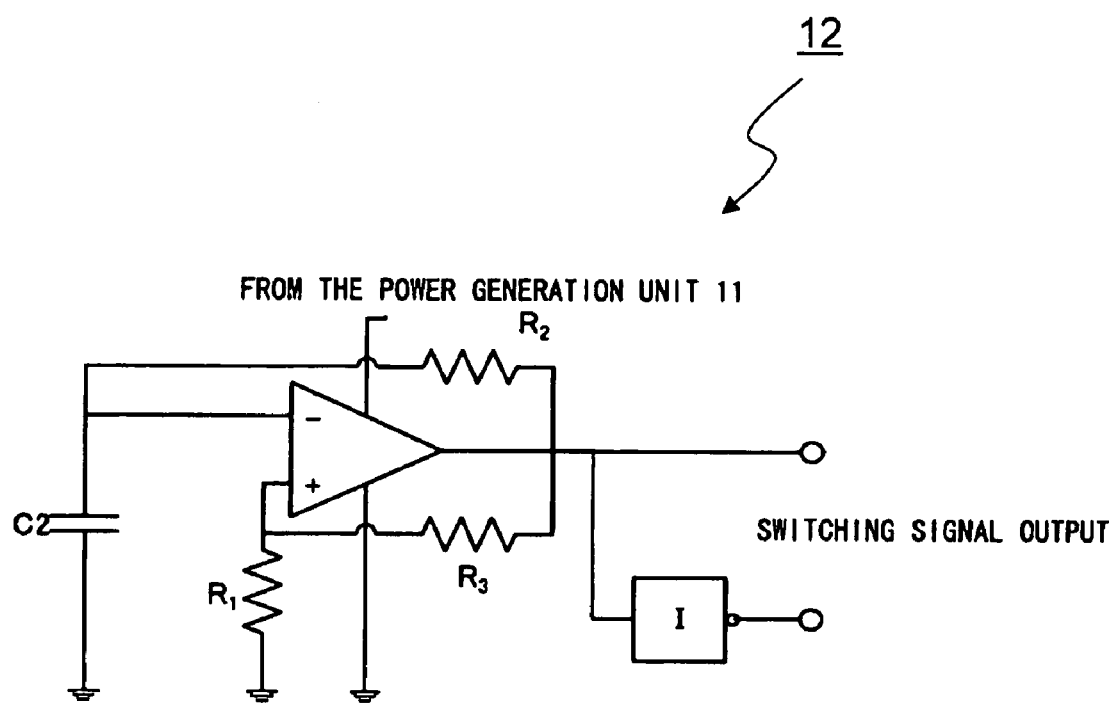
FIG. 4 shows an example of a switching signal generation unit according to a preferred embodiment.

FIG. 4 shows an example of the switching signal generation unit 12. The switching signal generation unit 12 shown by FIG. 4 is a self-running multi-vibrator comprising an operational amplifier, resistors R1 through R3, and a capacitor C2. Accordingly the switching signal generation unit 12 outputs a repeating alternating H (on state) signal and L (off state) signal in an interval established by the resistances of resistors R1 through R3 and the capacitance of capacitor C2.

An inverter circuit I is equipped to the output of the operational amplifier for inverting the output therefrom. This is configured to use an H level signal as an on-signal and an L level signal as an off-signal, and, if the output of the operational amplifier and that of the inverter circuit I are the signals for selecting the respective antenna ports, generate a switching signal for selecting two antenna ports (i.e., two antennas) alternately.

FIG. 5 shows an example of the switching signal generation unit 12 according to another preferred embodiment. The switching signal generation unit 12 shown by FIG. 5 comprises a comparator 51 for detecting an ID tag signal superimposed with an RF signal and a CPU 52 for generating a switching signal based on the detected ID tag signal. Note that the ID tag signal is defined as a signal expressing the data to be transmitted from the reader/writer 2 to the ID tag 101.

A signal transmitted by the reader/writer 2 is an RF signal of 100 MHz, over which an ID tag signal of 10 kHz is superimposed. The RF signal is filtered through a low pass filter blocking the signal component of the RF band and then input to the comparator 51. Here, the configuration may be such that the function of a low pass filter is provided by the power generation unit 11 for example.

With the RF band component of the signal being removed, the ID tag signal will be inputted to the comparator 51 which then judges the state of the ID tag signal (i.e., H or L level), thereby recovering the ID tag signal. The recovered ID tag signal is input to the CPU 52.

Incidentally, transmission and response periods are respectively predetermined for each antenna in the reader/writer 2 exchanging the signals with the ID tag 101 while switching a plurality of antennas sequentially, where the transmission period is defined as a period for the reader/writer 2 to transmit ID tag signals to the ID tag 101, and the response period is defined as a period for each ID tag 101 to respond back to the reader/writer 2 with a response signal based on the ID tag signal. Therefore, the communication efficiency of the RFID system 100 will be reduced if antenna switching takes place in the middle of a response period.

Accordingly, the antenna switching equipment 1 of the present embodiment detects the start timing of a transmission period by recognizing an ID tag signal superimposed on an RF signal. Here, an ID tag signal is recognized by detecting a predefined data pattern as the ID tag signal by using the CPU 52, for example, which is knowledgeable about the transmission and response periods and therefore outputs a signal for instructing to switch to an antenna to be used when a predetermined time elapses from detecting the ID tag signal (e.g., a timing for a response period to end).

Such a configuration enables the reader/writer 2 to communicate with a higher number of ID tags 101, hence improving communication efficiency.

Figure 6:
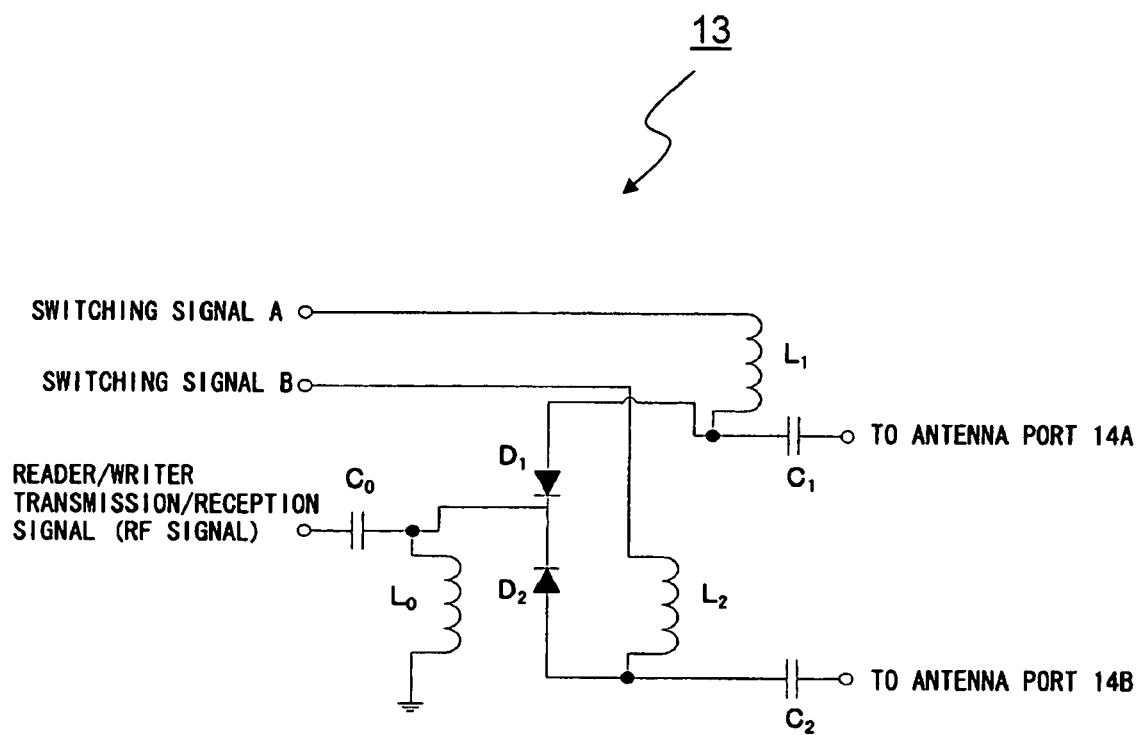
FIG. 6 shows an example of a high frequency switch unit according to a preferred embodiment.

FIG. 6 shows an example of the high frequency switch unit 13. The present embodiment shown by FIG. 6 is configured to switch two antenna ports 14 (i.e., 14A and 14B) alternately, comprising diodes D1 and D2 as a high frequency switch, capacitors C0 through C2 for cutting off DC and biasing coils L0 through L2.

The inputted switching signals A and B are for selecting the antenna ports 14A and 14B, respectively, where the switching signal A being at H level (i.e., on-state) is equal to the switching signal B being at L level (i.e., off-state), and the switching signal A being at L level is equal to the switching signal B being at H level.

When the switching signal A is at H level, the current flows through the coil L1, diode D1 and coil L0, thus the inputted RF signal is sent to the antenna port 14A by way of the diode D1 and capacitor C1. As the switching signal B is at L level at this time, the inputted RF signal cannot go through the diode D2, and hence is not led to the antenna port 14B. Likewise, when the switching signal B is at H level, the current flows by way of the coil L2, diode D2 and coil L0, thus the inputted RF signal is transmitted to the antenna port 14B by way of the diode D2 and capacitor C2.

Figure 7:
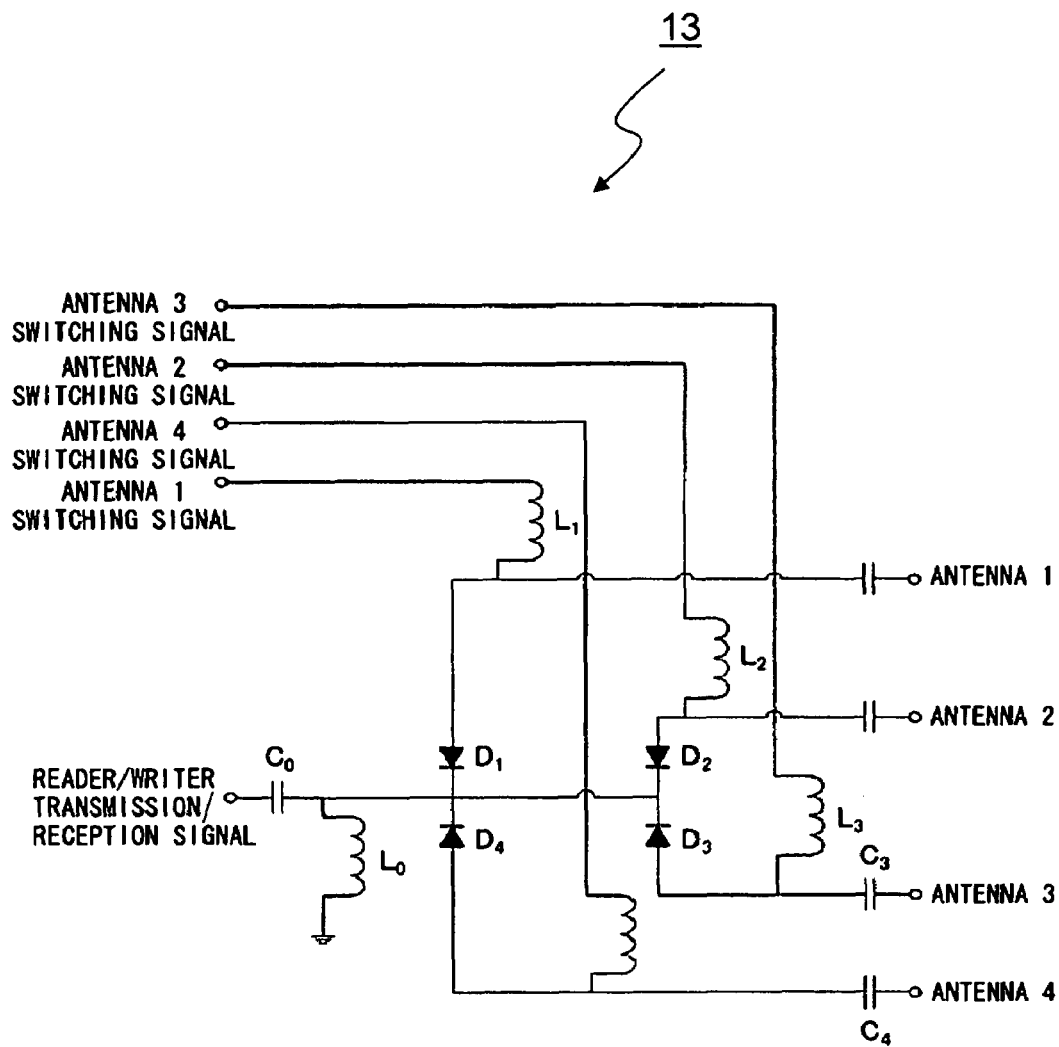
FIG. 7 shows an example of a high frequency switch unit according to another preferred embodiment.

FIG. 7 shows an example of the high frequency switch unit 13 according to another preferred embodiment, showing an example with four existing antennas (i.e., antenna ports) to be switched. As in the case shown by FIG. 6, a switching signal corresponding to any one of the antennas is in an on-state in this case, an RF signal from the reader/writer 2 will be led to the antenna port corresponding to the switching signal being in the on-state. In other cases where there are three, five or more antennas to be switched, an embodiment of the same high frequency switch unit 13 will enable switching to the appropriate antenna.

Figure 8B:
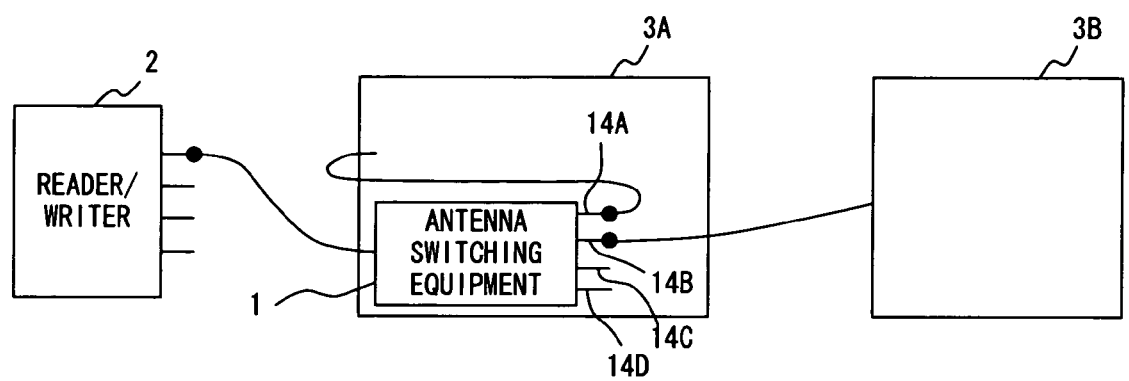
FIG. 8B describes how antenna switching equipment is furnished (part 2)

FIGS. 8A and 8B describes how the antenna switching equipment 1 is actually furnished in an RFID system 100 according to the present embodiment. FIG. 8A describes how the antenna switching equipment 1 according to the present embodiment is furnished for use between the reader/writer 2 and antenna 3; and FIG. 8B describes how the antenna switching equipment 1 according to the present embodiment is mounted within the antenna 3.

The antenna switching equipment 1 shown by FIG. 8A is connected to the I/O port 43 of the reader/writer 2. And the antenna switching equipment 1 comprises four antenna ports 14A through 14D, enabling mounting of a maximum of four antennas. In FIG. 8A, the antenna ports 14A through 14C are connected to the antennas 3A through 3C, respectively.

The antenna switching equipment 1 according to the present embodiment comprises the power generation unit 11 therein for generating electric power from an RF signal as described in reference to FIGS. 3 through 7, needing no external power supply. Furthermore, the antenna switching equipment 1 generates a switching signal for switching antenna ports without receiving a switching signal from the reader/writer 2, thereby enabling an addition of antenna without changing the configuration of the reader/writer 2.

The antenna switching equipment 1 shown by FIG. 8B is mounted within the antenna 3. In this example, the antenna switching equipment 1 is mounted within the antenna 3A. Therefore, the antenna port 14A among the antenna ports 14A through 14D comprised by the antenna switching equipment 1 is connected to the antenna 3A fixedly; and the antenna switching equipment 1 is configured to connect with additional antennas by using other antenna ports 14B through 14D.

FIG. 9 is a flow chart of operating the antenna switching equipment 1 according to a preferred embodiment. Here, the assumed configuration is such that the antenna switching equipment 1 comprises two antenna ports 14A and 14B, with each port being connected by the antennas 3A and 3B, respectively. Incidentally, the processing is carried out by the CPU 52 shown by FIG. 5.

The first step is to power on the antenna switching equipment 1 (step S1). This actually occurs by the power generation unit 11 shown by FIG. 1 supplying electric power generated by an RF signal from the reader/writer 2 as described above.

As the supply of electric power is started, the antenna switching equipment 1 waits for a transmission signal from the reader/writer 2 (step S2), followed by reading a transmission signal therefrom (step S3). Then, it is judged whether or not the transmission signal contains an ID tag signal (step S4) and, if an ID tag is not contained therein, returns to the step S2, while if an ID tag signal is contained therein, then proceeds to the step S5.

Then, the timer is initialized and starts counting up (step S5), followed by judging which of the antennas 3A or 3B is in use (step S6). If the antenna 3B is in use, the process proceeds to the step S7 and generates a switching signal for switching the antennas to be used from 3B to 3A at the time of expiration of the above described timer and returns to the step S2. Conversely, if the antenna 3A is in use, the process proceeds to the step S8 and likewise generates a switching signal for switching the antenna to be used from 3A to 3B at the time of expiration of the timer, and returns to the step S2. The same processing will be repeated thereafter.

Note that the case of switching between two antennas has been exemplified for the description of FIG. 9, but the present embodiment is not limited as such. For example, it may be the case that switching is between four antennas as shown by FIG. 7, in which case a sequence of cyclic change of using antennas among the antenna ports 14A through 14D is prescribed so as to switch to an antenna port to be used at the time of expiration of the timer.

Meanwhile, a portion of the electric power supplied by the RF signal transmitted from the reader/writer 2 to ID tag 101 is consumed by operating the antenna switching equipment 1 per se according to the configuration of the antenna switching equipment 1 of the present embodiment. This causes the electric power from the RF signal transmitted by way of the antenna 3 to be reduced by the amount that is consumed by the antenna switching equipment 1. That is, connecting the antenna switching equipment 1 to the reader/writer 2 will shorten the range of radio wave as compared to the case of not connecting the antenna switching equipment 1. However, suppressing the power consumption of the antenna switching equipment 1 so as to minimize a voltage drop adequately is relatively easy in the actually transmitted RF signal. In a simulation conducted by the applying entity of the presently proposed invention; with the electric power of the RF signal outputted from the reader/writer being one watt (1 W) and the power consumption of the antenna switching equipment 1 being 100 mW, the distance of the ID tag 101 from the reader/writer 2 within which the reader/writer is able to detect a signal decreased merely from 2.02 m to 1.91 m.

As described above, the antenna switching equipment 1 according to the present embodiment generates electric power by using the RF signal continuously transmitted from the reader/writer 2 for communication between the reader/writer 2 and ID tag. Furthermore, the antenna switching equipment generates a switching signal therein for switching antennas without receiving an instruction for switching from the reader/writer 2. And a use of the thus generated switching signal will switch a plurality of antenna ports (i.e., antennas) sequentially. Therefore, connection of the antenna switching equipment 1 of the present embodiment between the reader/writer 2 and antenna 3 enables an addition of an antenna 3 for a specific direction without changing the reader/writer 2 per se, making it possible in turn to suppress an occurrence of radio wave interference, et cetera.

What is claimed is:

1. An antenna switching equipment for switching between antennas used for a reader/writer in an RFID system, comprising:
    a plurality of antenna ports connected to the antennas;
    a power supply unit for generating electric power from an RF signal outputted from the reader/writer;
    a switching signal generation unit, operating on electric power generated by the power supply unit, for generating a switching signal which specifies an antenna port to be used from among the plurality of antenna ports; and
    a switching unit, operating on electric power generated by the power supply unit, for switching a connection between the reader/writer and the plurality of antenna ports based on a switching signal generated by the switching signal generation unit.

2. The antenna switching equipment according to claim 1, wherein the switching signal generation unit generates a switching signal for specifying one of the plurality of antenna ports sequentially in a predetermined time interval.

3. The antenna switching equipment according to claim 1, wherein
    the switching signal generation unit comprises a self-running multi-vibrator circuit which repeats on and off states alternately in a predetermined interval.

4. The antenna switching equipment according to claim 1, wherein
    the switching signal generation unit comprises
    a self-running multi-vibrator circuit which repeats on and off states alternately in a predetermined interval, and
    an inverter circuit for inverting an output signal from the self-running multi-vibrator circuit, wherein
    the switching unit uses a first antenna port while the self-running multi-vibrator circuit outputs an on signal, whereas the switching unit uses a second antenna port while the inverter circuit outputs an on signal.

5. The antenna switching equipment according to claim 1, comprising
    a detection unit for detecting an ID tag signal superimposed with the RF signal, wherein
    the switching signal generation unit outputs the switching signal for switching an antenna port to be used when a certain time has elapsed from the time of detecting an ID tag signal by the detection unit.

6. An antenna system for an RFID reader/writer comprising:
    an antenna;
    an antenna port for connecting the antenna;
    one or more add-on antenna ports for connecting an additional antenna;
    a power supply unit for generating electric power from an RF signal outputted from the reader/writer;
    a switching signal generation unit, operating on electric power generated by the power supply unit, for generating a switching signal which specifies an antenna port to be used from among the add-on antenna ports; and
    a switching unit, operating on electric power generated by the power supply unit, for switching a connection between the reader/writer and the add-on antenna ports based on a switching signal generated by the switching signal generation unit.

7. An antenna system for an RFID reader/writer, comprising:
    an antenna;
    a plurality of antenna ports;
    a power supply unit for generating electric power from an RF signal outputted from the reader/writer;
    a switching signal generation unit, operating on electric power generated by the power supply unit, for generating a switching signal which specifies an antenna port to be used from among the plurality of antenna ports; and
    a switching unit, operating on electric power generated by the power supply unit, for switching a connection between the reader/writer and the plurality of antenna ports based on a switching signal generated by the switching signal generation unit, wherein
    the antenna and at least one additional antenna are connected to the antenna ports.

* * * * *

UNITED STATES PATENT AND TRADEMARK OFFICE
CERTIFICATE OF CORRECTION

| | |
|---|---|
| PATENT NO. | : 7,317,379 B2 |
| APPLICATION NO. | : 11/169693 |
| DATED | : January 8, 2008 |
| INVENTOR(S) | : Shigekazu Kimura |

It is certified that error appears in the above-identified patent and that said Letters Patent is hereby corrected as shown below:

Col. 2, line 29, should deleted and replaced with the following corrected paragraph:

The switching signal generation unit may be configured to generate a switching signal for specifying one of the plurality of antenna ports sequentially in a predetermined interval. Alternatively, the switching signal generation unit may be configured to include a free-running multi-vibrator circuit which repeats on and off states alternately in a predetermined interval. Or, by comprising a detection unit for detecting an ID tag signal superimposed with the RF signal, the switching signal generation unit may be configured to output the switching signal for switching to an antenna port to be used when a predetermined time is elapsed after the detection unit has detected the ID tag signal. Either of the above described switching signal generation units is capable of generating a switching signal for switching antenna ports one after another, thereby enabling transmission diversity and helping to improve the quality of communication.

Col. 4, line 56, should be deleted and replaced with the following corrected paragraph:

Fig. 4 exemplifies a comprisal of the switching signal generation unit 12. The switching signal generation unit 12 shown by Fig. 4 is a free-running multi-vibrator comprising an operational amplifier, resistors R1 through R3, and a capacitor C2. Accordingly the switching signal generation unit 12 outputs a repeating alternating H (on state) signal and L (off state) signal in an interval established by the resistances of resistors R1 through R3 and the capacitance of capacitor C2.

Claims 3 and 4 should read as follows:

Col. 8, line 7,
3. The antenna switching equipment according to claim 1, wherein
     the switching signal generation unit comprises a free-running multi-vibrator circuit which repeats on and off states alternately in a predetermined interval.

UNITED STATES PATENT AND TRADEMARK OFFICE
CERTIFICATE OF CORRECTION

PATENT NO. : 7,317,379 B2
APPLICATION NO. : 11/169693
DATED : January 8, 2008
INVENTOR(S) : Shigekazu Kimura It is certified that error appears in the above-identified patent and that said Letters Patent is hereby corrected as shown below:

Col. 8, line 12,
4. The antenna switching equipment according to claim 1, wherein
    the switching signal generation unit comprises
    a free-running multi-vibrator circuit which repeats on and off states alternately in a predetermined interval, and
    an inverter circuit for inverting an output signal from the free-running multi-vibrator circuit, wherein
    the switching unit uses a first antenna port while the free-running multi-vibrator circuit outputs an on signal, whereas the switching unit uses a second antenna port while the inverter circuit outputs an on signal.

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,317,379 B2 | Page 1 of 2 |
| APPLICATION NO. | : 11/169693 | |
| DATED | : January 8, 2008 | |
| INVENTOR(S) | : Shigekazu Kimura | |

It is certified that error appears in the above-identified patent and that said Letters Patent is hereby corrected as shown below:

Col. 2 lines 29-39 should read,

The switching signal generation unit may be configured to generate a switching signal for specifying one of the plurality of antenna ports sequentially in a predetermined interval. Alternatively, the switching signal generation unit may be configured to include a free-running multi-vibrator circuit which repeats on and off states alternately in a predetermined interval. Or, by comprising a detection unit for detecting an ID tag signal superimposed with the RF signal, the switching signal generation unit may be configured to output the switching signal for switching to an antenna port to be used when a predetermined time is elapsed after the detection unit has detected the ID tag signal. Either of the above described switching signal generation units is capable of generating a switching signal for switching antenna ports one after another, thereby enabling transmission diversity and helping to improve the quality of communication.

Col. 4 lines 56-63 should read,

Fig. 4 exemplifies a comprisal of the switching signal generation unit 12. The switching signal generation unit 12 shown by Fig. 4 is a free-running multi-vibrator comprising an operational amplifier, resistors R1 through R3, and a capacitor C2. Accordingly the switching signal generation unit 12 outputs a repeating alternating H (on state) signal and L (off state) signal in an interval established by the resistances of resistors R1 through R3 and the capacitance of capacitor C2.

Col. 8 lines 7-11 should read,

3. The antenna switching equipment according to claim 1, wherein
    the switching signal generation unit comprises a free-running multi-vibrator circuit which repeats on and off states alternately in a predetermined interval.

Col. 8 lines 12-22 should read,

4. The antenna switching equipment according to claim 1, wherein
    the switching signal generation unit comprises
    a free-running multi-vibrator circuit which repeats on and off states alternately in a predetermined interval, and
    an inverter circuit for inverting an output signal from the free-running multi-vibrator circuit, wherein

UNITED STATES PATENT AND TRADEMARK OFFICE
CERTIFICATE OF CORRECTION

PATENT NO. : 7,317,379 B2
APPLICATION NO. : 11/169693
DATED : January 8, 2008
INVENTOR(S) : Shigekazu Kimura It is certified that error appears in the above-identified patent and that said Letters Patent is hereby corrected as shown below:

the switching unit uses a first antenna port while the free-running multi-vibrator circuit outputs an on signal, whereas the switching unit uses a second antenna port while the inverter circuit outputs an on signal.

Signed and Sealed this

Seventh Day of October, 2008

JON W. DUDAS
*Director of the United States Patent and Trademark Office*